United States Patent
DeFranks et al.

(10) Patent No.: US 9,161,634 B2
(45) Date of Patent: Oct. 20, 2015

(54) ASYMMETRICAL COMBINED CYLINDRICAL AND CONICAL SPRINGS

(75) Inventors: Michael S. DeFranks, Decatur, GA (US); Jeremy Lynn, Newnan, GA (US)

(73) Assignee: DREAMWELL, LTD., Las Vegas, NV (US)

( * ) Notice: Subject to any disclaimer, the term of this patent is extended or adjusted under 35 U.S.C. 154(b) by 0 days.

(21) Appl. No.: 11/978,869

(22) Filed: Oct. 29, 2007

(65) Prior Publication Data

US 2009/0106908 A1    Apr. 30, 2009

(51) Int. Cl.
*A47C 27/06*      (2006.01)
*F16F 1/04*       (2006.01)
*A47C 23/043*     (2006.01)
*F16F 1/08*       (2006.01)

(52) U.S. Cl.
CPC ........... *A47C 27/065* (2013.01); *A47C 23/0438* (2013.01); *A47C 27/064* (2013.01); *F16F 1/04* (2013.01); *A47C 23/043* (2013.01); *F16F 1/042* (2013.01); *F16F 1/047* (2013.01); *F16F 1/08* (2013.01)

(58) Field of Classification Search
CPC .. A47C 23/04–23/0438; A47C 27/04–27/064; F16F 1/04–1/08
USPC ........... 5/716, 256, 655.8, 720, 248; 267/180, 267/80, 166, 166.1, 168, 142, 144, 33, 152, 267/153, 91–101; 72/128
See application file for complete search history.

(56) References Cited

U.S. PATENT DOCUMENTS

| | | | |
|---|---|---|---|
| 485,652 A | 11/1892 | Pfingst | |
| 804,352 A | 11/1905 | Van Cise | |
| 1,254,314 A * | 1/1918 | D'arcy | 5/264.1 |
| 1,741,847 A * | 12/1929 | Kaspar | 5/655.8 |
| 1,963,053 A | 6/1934 | Powers | |
| 2,257,994 A * | 10/1941 | Zofnass | 5/701 |
| 2,461,062 A * | 2/1949 | Kane | 5/720 |
| 2,480,158 A * | 8/1949 | Owen | 267/91 |
| 3,751,025 A * | 8/1973 | Beery et al. | 267/166.1 |
| 3,789,440 A * | 2/1974 | Garceau | 5/256 |
| 4,111,407 A * | 9/1978 | Stager | 267/166.1 |
| 4,120,489 A | 10/1978 | Borlinghaus | |
| 4,244,089 A * | 1/1981 | Cavaler | 29/91.1 |

(Continued)

FOREIGN PATENT DOCUMENTS

EP    1337357 B1    8/2003
EP    2209403 A2    7/2010

(Continued)

OTHER PUBLICATIONS

He et al. "Nonlinear theory of conical helical spring" 26(5):628-632, 2005.

(Continued)

*Primary Examiner* — Peter M Cuomo
*Assistant Examiner* — Brittany Wilson
(74) *Attorney, Agent, or Firm* — Cantor Colburn LLP

(57) ABSTRACT

A mattress comprising asymmetrical coil springs with non-linear spring rates provides comfort to users with different weights. The lower portion of the spring is cylindrical and the upper portion is conical or frustoconical. This arrangement causes the spring to undergo linear compression before undergoing nonlinear compression. The result is a mattress that is sufficiently soft for lighter users and sufficiently firm for heavier users.

22 Claims, 7 Drawing Sheets

(56) References Cited

U.S. PATENT DOCUMENTS

| | | | |
|---|---|---|---|
| 4,424,695 A | | 1/1984 | Kirchhoff et al. |
| 4,480,823 A | * | 11/1984 | Marcinczyk et al. ........... 267/91 |
| 4,529,848 A | | 7/1985 | Cherry |
| 4,699,362 A | * | 10/1987 | Krakauer ........................ 267/91 |
| 4,733,036 A | | 3/1988 | Koizumi et al. |
| 5,507,476 A | | 4/1996 | Lin |
| 5,509,642 A | * | 4/1996 | Wells .............................. 267/92 |
| 5,642,539 A | | 7/1997 | Kuo |
| 5,699,998 A | * | 12/1997 | Zysman ......................... 5/655.8 |
| 5,868,383 A | | 2/1999 | Codos |
| 5,878,998 A | * | 3/1999 | Hsieh ........................ 267/166.1 |
| 6,128,798 A | | 10/2000 | Barman et al. |
| 6,256,820 B1 | * | 7/2001 | Moser et al. ................... 5/655.8 |
| 6,391,685 B1 | | 5/2002 | Hikita et al. |
| 6,523,812 B1 | * | 2/2003 | Spinks et al. ..................... 5/720 |
| 6,533,259 B2 | * | 3/2003 | Devambe ..................... 267/166 |
| 6,931,685 B2 | | 8/2005 | Kuchel et al. |
| 6,944,899 B2 | * | 9/2005 | Gladney ............................ 5/716 |
| 7,168,117 B2 | | 1/2007 | Gladney |
| 7,178,187 B2 | | 2/2007 | Barman et al. |
| 7,418,753 B2 | | 9/2008 | Kuchel et al. |
| 7,677,541 B2 | | 3/2010 | Ahn |
| 7,921,561 B2 | | 4/2011 | Eigenmann et al. |
| 2005/0005354 A1 | | 1/2005 | Gladney |
| 2005/0056066 A1 | | 3/2005 | DeFranks et al. |
| 2006/0042013 A1 | | 3/2006 | Madsen |
| 2006/0042016 A1 | | 3/2006 | Barman et al. |
| 2009/0106908 A1 | | 4/2009 | DeFranks et al. |
| 2011/0148018 A1 | | 6/2011 | DeFranks et al. |

FOREIGN PATENT DOCUMENTS

| | | | | |
|---|---|---|---|---|
| FR | 2584284 A1 | * | 1/1987 | ............ A47C 27/18 |
| RU | 20060109492 | | 5/2009 | |
| WO | 9844273 A1 | | 10/1998 | |
| WO | WO-9844273 A1 | | 10/1998 | |
| WO | 03096847 A1 | | 11/2003 | |
| WO | WO-03/096847 | | 11/2003 | |
| WO | 2009058251 A2 | | 5/2009 | |
| WO | WO-2012/099888 A1 | | 7/2012 | |

OTHER PUBLICATIONS

Rodriguez et al. "Exploiting analytical laws for a constant-pitch conical compression spring" Springs 46(1):33-37, 2007.

Science Behind Sleep, http://www.sleepsymphonie.com/sci_sleep.htm, Oct. 12, 2007.

International Search Report issued Nov. 30, 2009 in co-pending PCT Application PCT/US2008/012198.

Office Action issued in Chinese Patent Application No. 200880120032.8, dated Feb. 17, 2012; 20 pages.

Office Action issued in Panamanian Patent Application No. 89558 on Jan. 21, 2013; 8 pages including English Translation.

Notice of Allowance issued in U.S. Appl. No. 29/383,932 dated Jan. 8, 2013; 7 pages.

Office Action issued in European Patent Application No. 08843531.8-1653, dated Mar. 1, 2013; 6 pages.

Accompanying Correspondence Letter for Office Action issued in Eurasian Patent Application No. 201070550 dated Nov. 13, 2013; 3 pages.

Office Action issued in Eurasian Patent Application No. 201070550 dated Oct. 21, 2013; 3 pages.

Office Action issued in Mexican Patent Application No. MX/a/2010/004770 dated Oct. 30, 2013; 2 pages.

Office Action issued in European Patent Application No. 08 843 531.8-1653, dated Jan. 16, 2014; 6 pages.

Office Action and Foreign Associate's Letter of Interpretation of Office Action, issued in Mexican Patent Application No. MX/a/2010/004770 on Jan. 21, 2014; 6 pages total.

International Preliminary Report on Patentability issued in International Application No. PCT/US2012/021568 dated Aug. 1, 2013; 5 pages.

Office Action issued in Canadian Patent Application No. 2,702,203 dated Feb. 23, 2015; 4 pages.

Office Action issued in Eurasian Patent Application No. 201070550, dated Nov. 28, 2014; 4 pages including Foreign Associate Transmittal Letter.

Office Action issued in Israeli Patent Application No. 205457, dated Dec. 8, 2014; 6 pages including Foreign Associate Transmittal Letter.

Office Action issued in Mexican Patent Application No. MX/a/2010/004770 dated Mar. 6, 2015, with Foreign Associate's Transmittal Letter; 14 pages.

Office Action and English Translation, issued in Chinese Patent Application No. 200880120032.8, dated May 20, 2013; 8 pages.

Office Action issued in Eurasian Patent Application No. 201070550 dated Jun. 4, 2014; 6 pages (including Foreign Associate Transmittal Letter).

* cited by examiner

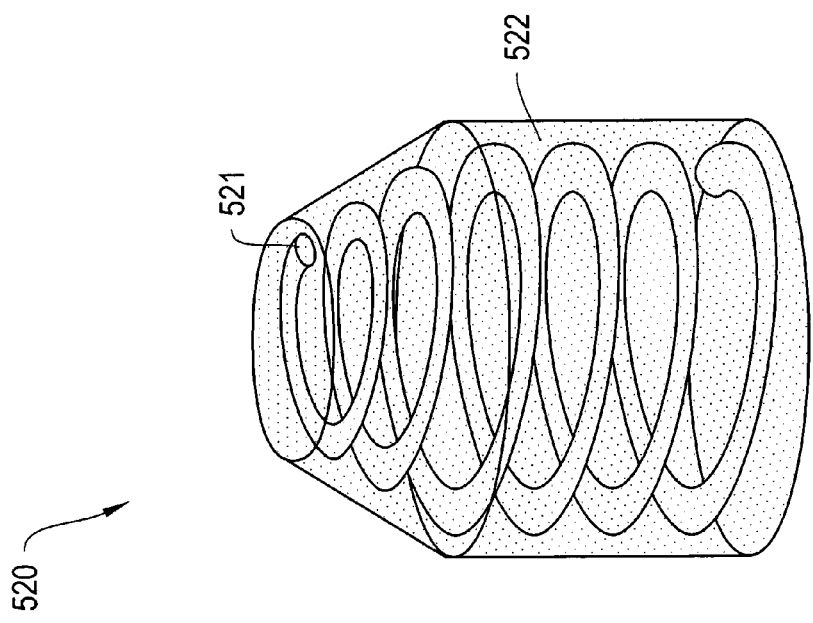
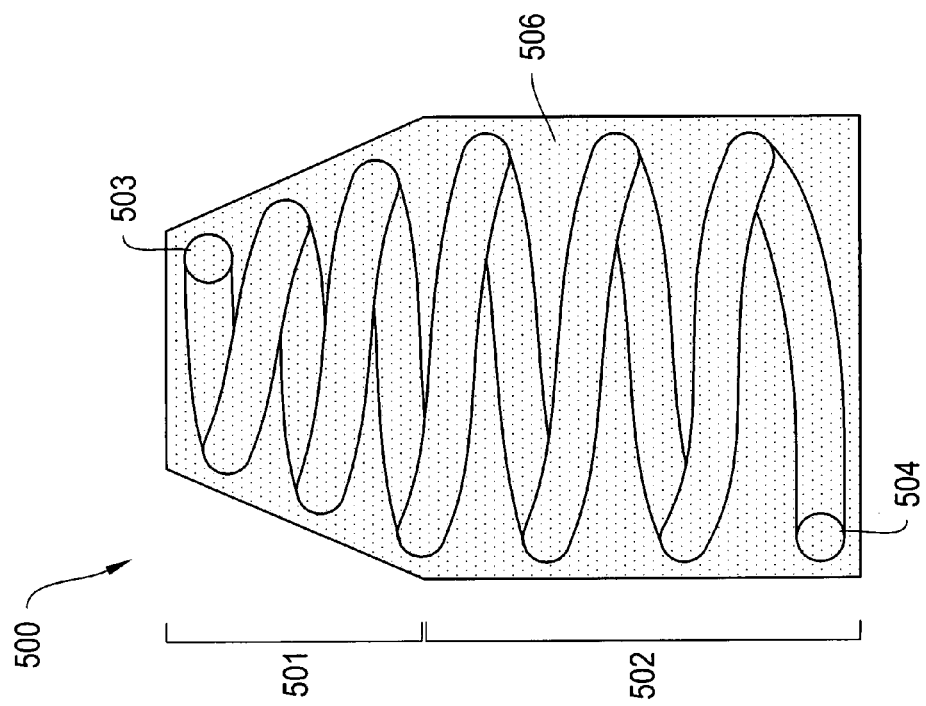
Fig. 4B
Fig. 4A

ASYMMETRICAL COMBINED CYLINDRICAL AND CONICAL SPRINGS

FIELD OF THE INVENTION

This invention relates to springs for use with an innerspring assembly in cushioning articles such as mattresses.

BACKGROUND OF THE INVENTION

Traditional spring mattresses generally contain an innerspring assembly having a set of springs that provide cushioning support to one or more users. When a user sleeps on the surface of the mattress, he/she applies a weight on the underlying springs, which in turn compress to provide adequate cushioning support. Typically, lighter users apply less weight on the springs, causing these springs to compress less and thereby providing a different feel to what a heavier person would experience. Consequently, lighter users might experience a different level of comfort as compared to heavier users for a given set of springs. This may present a problem when two sleeping partners are of significantly different weights, for example 120 lbs and 220 lbs. In such cases, one mattress is unlikely to be comfortable for both partners.

One reason that a traditional mattress may be more comfortable to certain users is that they are often constructed with springs having a linear spring rates. Such springs compress a distance that is linearly proportional to the weight of the user, until they reach full compression. Therefore springs may compress less under a light person than under a heavy person. Engineers have attempted to work around this problem by making mattress having springs with non-linear spring rates (e.g., conical springs). Such non-linear springs may compress significantly under a light person and yet not fully compress under a heavy person, occasionally providing similar levels of comfort for both. However, even non-linear springs such as conical springs are disadvantageous because of certain properties and general irregular shape. In particular, below a certain weight threshold, these springs still compress linearly with the weight applied. Non-linear type compression typically occurs beyond this weight threshold. Therefore, typical non-linear springs would have to significantly compress prior to a user experiencing a desired level of comfort. In other words, users would have to be of sufficient weight before they can experience a certain level of comfort provided by the springs' non-linear compression. Besides the disadvantage of requiring a heavy user, such significant compression of the innerspring assembly can also be unsuitable for the life of the bed. Moreover, mattresses having non-linear springs are difficult to manufacture because of the irregular shape of the spring coils. For example, conical springs are particularly difficult to assemble because they can not be in contact throughout their length as is called for in some methods of mattress assembly.

Accordingly, there is a need for a mattress that is comfortable for users with a broad range of weights. Generally, there is a need for a cushioning article that provides a similar level of cushioning support for a wide range of users.

BRIEF SUMMARY OF THE INVENTION

The systems and methods described herein include innerspring assemblies for cushioning articles such as mattresses. The innerspring assemblies may have one or more asymmetrical springs that are configured to provide a similar level of firmness to users with different weights. The asymmetrical springs include portions having linear and non-linear spring rates. In one example, an asymmetrical spring includes an upper conical portion and lower cylindrical portion. Such an arrangement allows a user of the mattress to experience non-linear compression without causing a substantial compression of the coil springs. The systems and methods provide for a mattress that is sufficiently soft for lighter users and sufficiently firm for heavier users.

For purposes of clarity, and not by way of limitation, the systems and methods may be described herein in the context of providing innerspring assemblies for mattresses. However, it will be appreciated that the principles described herein may be adapted to a wide range of applications. For example, the principles of this disclosure may be applied to couches where a cushion is affixed to a larger assembly. In addition, the principles may be applied to chairs, loveseats, sofas, daybeds, automotive seats, crib mattresses, fold-out couches, and folding mattresses. More generally, the systems described herein may be employed in any environment where it is desirable to provide support for a wide variety of users.

More particularly, the systems and methods described herein provide for an innerspring assembly including a plurality of spring coils having an upper spring portion and a lower spring portion. The upper spring portion has a first substantially linear spring rate and a first substantially non-linear spring rate. The lower spring portion may be disposed below the upper spring portion and may have a second substantially linear spring rate. In certain embodiments, the second substantially linear spring rate is greater than the first substantially linear spring rate. The spring coil may be configured such that the upper portion compresses substantially before the lower portion compresses substantially. The upper spring portion may include a plurality of coils having a first pitch, and the lower spring portion may include a plurality of coils having a second pitch. The plurality of coils of the upper spring portion may have a similar first pitch. The plurality of coils of the lower spring portion may have a similar second pitch. In certain embodiments, the first pitch is different from the second pitch. The first pitch may be greater or less than the second pitch. In other embodiments, the first pitch is the same or substantially similar to the second pitch. The pitch of a spring coil may affect its spring rate, and the spring coil may have pitches that confer linear and nonlinear spring rates on it. In certain embodiments, the upper spring portion of the spring coil is substantially conical or substantially frustoconical. The lower spring portion of the spring coil may be substantially cylindrical. The spring coil may be an encased coil or an open coil. In certain embodiments, the spring coil is formed from metallurgical composition containing one or more elements selected from the group of steel, chromium, nickel, molybdenum, copper, titanium, cobalt, niobium, vanadium, aluminum, platinum, and tungsten.

The spring coil may be formed from a wire and may include a wire of equal diameter throughout the length of the spring coil. Alternatively, the spring coil may include a wire of varying diameter. In certain embodiments, the upper spring portion has a first diameter and the lower spring portion has a second diameter, such that the first diameter is less than the second diameter. The upper spring portion may include a wire of a first diameter and the lower spring portion may include a wire of a second diameter, such that the first diameter is greater than the second diameter. The spring coils may be formed from a single-stranded wire cable. In certain embodiments, the spring coil is formed from multi-stranded wire cable such as those described in U.S. Pat. No. 7,168,117, incorporated herein by reference in its entirety. Methods for manufacturing spring coils from multi-stranded wire cable can be found in U.S. Patent Application Publication No. US 2005-0056066 A1, incorporated herein by reference in its entirety.

In certain embodiments, the upper spring portion of the spring coil comprises between one fourths and three fourths of the spring coil height. The upper portion of the spring coil may have a top end and a bottom end and a diameter. In certain embodiments, the diameter of the spring coil monotonically increases from the top end to the bottom end. In certain embodiments, the spring coil includes an offset coil at each end. An offset coil may be a large coil that enhances the stability of the spring coil. An offset coil may also facilitate the manufacturing process.

The spring coils may arranged in rows and columns such that each spring coil is adjacent to at least one other spring coil. Adjacent spring coils may be connected with adhesive. Alternatively, adjacent spring coils may be connected with a hog ring or other metal fasteners. In yet other embodiments, adjacent spring coils are not connected along the upper portion of the coils. Leaving the top portion of coils unconnected allows one spring to compress without affecting its neighbor. This practice allows one sleeper to move on a mattress without disturbing the other sleeper.

In certain embodiments, the innerspring assembly is adapted for a cushioned support structure such as a mattress. The cushioned support structure may be a standard mattress size such as twin, twin XL, full, full XL, queen, Olympic queen, king, or California king. It may also be a custom size. In addition, the cushioned support structure could be a smaller mattress designed for a child or baby. Such a mattress may be part of a crib or cradle.

In certain embodiments, the cushioned support structure further comprises at least one additional layer disposed adjacent to the innerspring assembly. In certain embodiments, the at least one additional layer includes at least one of a padding layer, an upholstery layer, a frame layer, a quilted layer, a foam layer, a batting layer, and a waterproof layer.

The systems and methods described herein further relate to an assembly of two stacked springs in an innerspring. This system of two stacked springs may have substantially the same spring rate as the asymmetrical spring described above. Specifically, an innerspring assembly may include a plurality of spring coils, comprising at least one spring coil assembly having an upper spring coil with a first substantially linear spring rate and a first substantially nonlinear spring rate, and a lower spring coil disposed below the upper spring coil with a second substantially linear spring rate, wherein the second substantially linear spring rate is greater than the first substantially linear spring rate, and wherein the spring coil is configured such that the upper portion compresses substantially before the lower portion compresses substantially.

The systems described herein additionally provide for a compression spring coil, comprising an upper conical portion with a first linear spring rate and a first nonlinear spring rate, and a lower cylindrical portion disposed below the upper spring portion with a second linear spring rate, wherein the second linear spring rate is greater than the first linear spring rate, and wherein the spring coil is configured such that the upper portion compresses substantially before the lower portion compresses substantially.

In addition, the systems and methods described herein relate to a compression spring coil for use in a mattress, comprising an upper conical spring with a first linear spring rate and a first nonlinear spring rate, and a lower cylindrical spring disposed below the upper spring portion with a second linear spring rate, wherein the second linear spring rate is greater than the first linear spring rate, and wherein the spring coil is configured such that the upper portion compresses substantially before the lower portion compresses substantially.

In one aspect, the systems detailed herein provide for a compression spring coil made from multi-stranded wire cable, comprising an upper spring portion with a first linear spring rate and a first nonlinear spring rate, and a lower spring portion disposed below the upper spring portion with a second linear spring rate. In one embodiment, this spring coil is part of an innerspring assembly, comprising at least one such coil. The upper spring portion may be substantially conical or substantially frustoconical. The lower spring portion may be substantially cylindrical.

The systems and methods herein further relate to a method of manufacturing said spring coil, comprising choosing a first linear spring rate and a first nonlinear spring rate for the upper portion, and choosing a second linear spring rate for the lower portion, such that the second linear spring rate is greater than the first linear spring rate, and such that the upper portion compresses substantially before the lower portion compresses substantially, and manufacturing a spring coil having the first linear spring rate, first nonlinear spring rate, and second linear spring rate. The spring coil may be manufactured using any techniques known in the art. A preferred technique uses a programmable coiling point and pitch tool.

BRIEF DESCRIPTION OF THE DRAWINGS

The foregoing and other objects and advantages of the invention will be appreciated more fully from the following further description thereof, with reference to the accompanying drawings wherein;

FIGS. 4A-4B depict various views of an exemplary encased asymmetrical spring.

DETAILED DESCRIPTION OF THE INVENTION

To provide an overall understanding of the invention, certain illustrative embodiments will now be described, including a mattress having at least one asymmetric coil with a non-linear spring rate. However, the embodiments set out below are merely for the purpose of illustration and it will be understood by one of ordinary skill in the art that the systems and methods described herein may be adapted and modified for other suitable applications and that such other additions and modifications will not depart from the scope hereof.

Figure 1C:
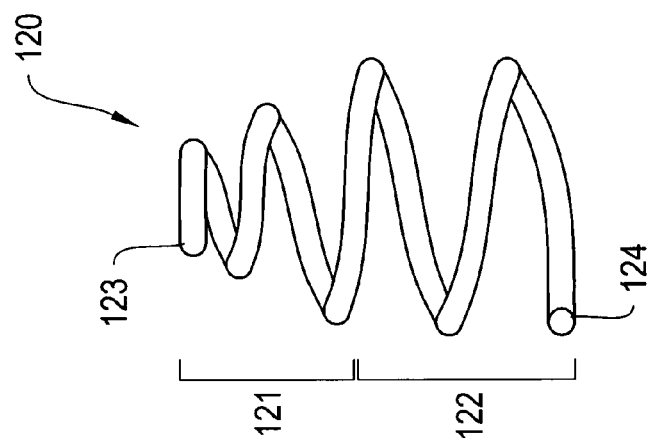
FIGS. 1A-3C depict asymmetrical springs, according to various illustrative embodiments of the invention.
Figure 1B:
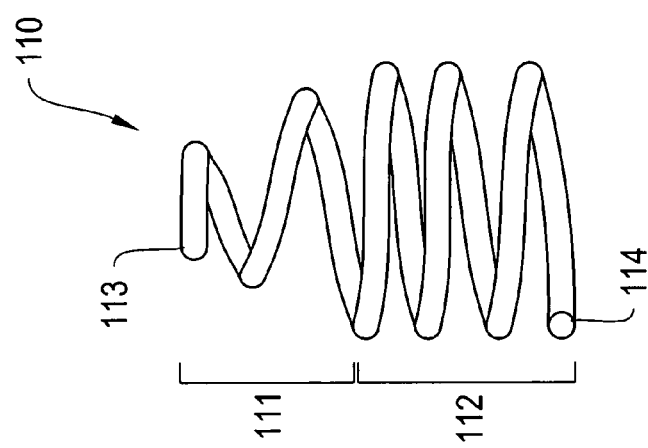
Figure 1A:
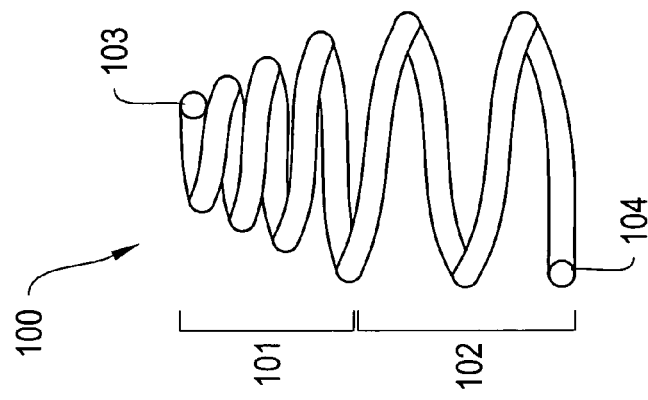

FIGS. 1A-1C depict exemplary asymmetrical springs having different spring characteristics across the length of the spring. In particular, FIG. 1A shows a spring coil 100 having a top portion 101 and a bottom portion 102. The spring coil 100 includes a top end 103 and a bottom end 104. The ends 103 and 104 may be turned into the spring so there are no sharp points protruding from the spring. The top portion 101 has a generally conical shape whereby the diameter of the spring coil in the top portion 101 decreases towards the top end 103. The bottom portion 102 is generally cylindrical such that the diameter stays substantially the same along the length of the spring coil 100 in the bottom portion 102. Being generally conical in shape, the top portion 101 allows for a non-linear compression of the spring coil 100 in response to a load. The generally cylindrical bottom portion 102 allows for more regularity in shape and prevents extensive compression of the entire spring coil 100.

One or more spring coils 100 may be combined in a suitable arrangement in an innerspring assembly of a mattress. As an example, the innerspring assembly may include a grid of spring coils 100 arranged in periodic rows and columns spanning a substantial portion of the length and width of a mattress. During operation, when a user applies a weight to the surface of the mattress, the springs coils 100 compress. During compression, the top portion 101 compresses in a non-linear fashion, owing at least to its conical shape and the bottom portion 102 compresses linearly. Depending on the nature and physical characteristics of the spring coil, the top portion 101 and the bottom portion 102 may compress differently to a certain applied weight. As illustrated in FIGS. 1A-1C, the top 101 and bottom portion 102 may have different pitches to effect different spring rates along the length of the spring coil 100.

More particularly, in FIG. 1A, the pitch, which may be the distance between adjacent turns of the spring coil 100, of the top portion 101 is less than the pitch of the bottom portion 102. In such embodiments, the distance between adjacent turns of the spring coil 100 in the top portion 101 may be similar, and the distance between adjacent turns of the spring coil 100 in the bottom portion 102 may be similar. However, the distance between adjacent turns of the spring coil 100 may be different in the top portion 101 from the distance in the bottom portion 102. In the illustrated embodiment, the distance between adjacent turns of the spring coil 100 in the top portion 101 is less than the distance between adjacent turns in the bottom portion 102.

FIG. 1B shows a spring coil 110 having a greater pitch in the top portion 111 than in the bottom portion 112. FIG. 1C shows a spring coil 120 having equal pitch angles in the top portion 121 and the bottom portion 122. The spring coil may have a top end 123 and a bottom end 124. In certain embodiments, depending on the value of the spring rates in the top portion 101 may compress before the bottom portion compresses 102. The top portion 101 may compress substantially before the bottom portion 102 begins to compress. In certain embodiments, the top portion 101 may compress substantially before the bottom portion 102 compresses substantially. In certain embodiments, depending on the value of the spring rates in the bottom portion 102 may compress before the top portion 101 compresses. The bottom portion 102 may compress substantially before the top portion 101 begins to compress. In certain embodiments, the bottom portion 102 may compress substantially before the top portion 101 compresses substantially. Each spring coil in FIGS. 1A, 1B and 1C may confer a different degree of softness or firmness to a mattress assembly having springs 100, 110 and 120.

The top portion 101 of the spring coil allows the spring to compress with a nonlinear spring rate. In this embodiment, the upper portion has a frustoconical shape. The bottom portion 102 has a cylindrical shape. Cylinders may be packed next to each other so that the two adjacent cylinders are in contact along their length. Similarly, asymmetric springs in an innerspring assembly may be in contact substantially along their cylindrical portion. Therefore, two asymmetrical springs of FIG. 1 may be encased in fabric and glued together along their cylindrical portion. An additional benefit of the cylindrical region is the lateral stability it confers on the spring.

The asymmetrical spring coil may be manufactured from a number of materials. A popular material for spring coils is the metallurgical composition commonly referred to as steel, which may contain elements such as chromium, nickel, molybdenum, copper, titanium, cobalt, niobium, vanadium, aluminum, platinum, and tungsten. The spring coil may also be formed from alloys of any of the above materials.

The asymmetric spring coil may also be formed from different kinds of wire. For example, the spring coil may be formed from one solid wire. In addition, the spring coil may be formed from multi-stranded wire cable. Such a spring coil may comprise a plurality of strands configured as a multi-strand cord, the multi-strand cord coiled into a helical spring as described in U.S. Pat. No. 7,168,117, incorporated herein by reference in its entirety. In certain embodiments, the solid or multi-stranded spring may be covered in a coating such as plastic. A coating may improve the longevity of the spring.

The spring coils of the illustrated embodiments may be manufactured by obtaining a wire and twisting it into the appropriate shape. A person or machine grasps both ends of the wire. One end is twisted, causing the wire to form a coil. In one practice, the wire may be first coiled to make a cylindrical spring having a diameter that is the narrowest diameter of the conical portion. The wire is then coiled back to enlarge the diameter of a few coils. An asymmetrical spring coil results. In another practice, the wire is coiled to make a cylindrical spring having a diameter that is the greatest diameter of the conical portion. The wire is then twisted further to decrease the diameter of a few coils. After the spring coil is formed, it may be hardened. For instance, one can temper the spring using heat.

A moveable coiling point, a moveable pitch tool and wire feeding rollers may be used in any combination or order to form spring coils. In one embodiment, first, wire feeding rollers send a wire from a spool to the moveable coiling point. The moveable coiling point may be a piece of metal around which the wire is wound to form a coil. The coiling point may rotate, spooling the wire around it. In certain embodiments, the wire may be coiled to form a spring coil that takes the shape and diameter of the coiling point. The methods described herein encompass the use of a coiling point that is shaped similar to a pencil, having a cylindrical portion and a tapered or conical or frustoconical portion. A wire wrapped around such a coiling point may form a spring with a cylindrical portion and a conical or frustoconical portion. While the wire is wrapped around the coiling point, the moveable pitch tool may slide along the side of the coiling point. The pitch tool may serve as a guide, determining the position of each coil. The pitch tool may control the coil's pitch between convolutions and thus the overall height of the spring. In certain embodiments, traditional manufacturing techniques use mechanical cams to control these motions. The mechanical cams typically have simple motion profiles, allowing for the tools to move out to a predetermined distance, set by the cam shape, and then return to their respective motion origins. The methods described herein encompass a manufacturing technique using programmable servo motors to control all three motions, allowing for precise motion control. The coiling point and pitch tool may be programmed to move to numerous positions within a single coil forming cycle, modifying the coil's diameter and pitch within the coil to produce complex coil geometries. The systems described herein may also be made with any technique known in the art without departing from the scope of the invention.

In certain embodiments, the spring rate of the spring coils may be modified by changing the shape of the at least one of the top portion and bottom portion of the spring coils. FIGS.

Figure 2B:
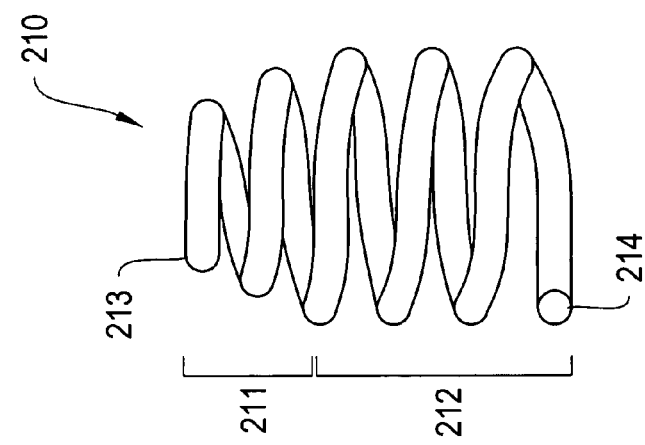
Figure 2A:
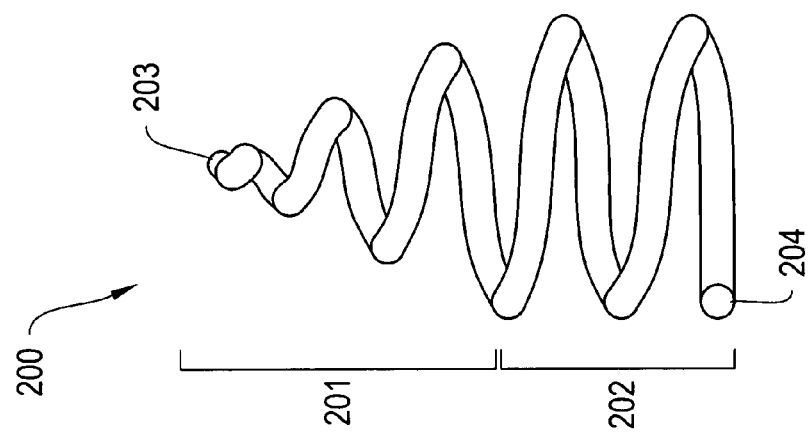

2A and 2B depict asymmetrical springs having an upper portion with different shapes. These shapes may influence the spring rate and thereby alter the firmness and comfort of the mattress. FIG. 2A shows a spring coil 200 having a conical top portion 201 and a cylindrical bottom portion 202. The spring coil may have a top end 203 and a bottom end 204. FIG. 2B shows a spring coil 210 having a frustoconical top portion 211 and a cylindrical bottom portion 212. The spring coil may have a top end 213 and a bottom end 214. In certain embodiments, the frustoconical top portion 211 may have a shape similar to a cone but flat on the top.

Figure 3C:
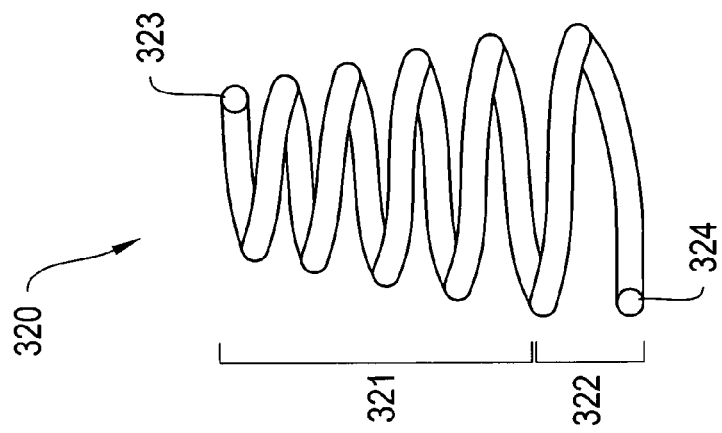
Figure 3B:
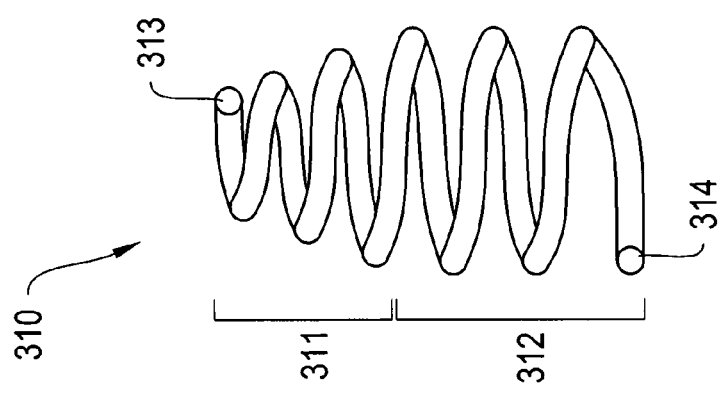
Figure 3A:
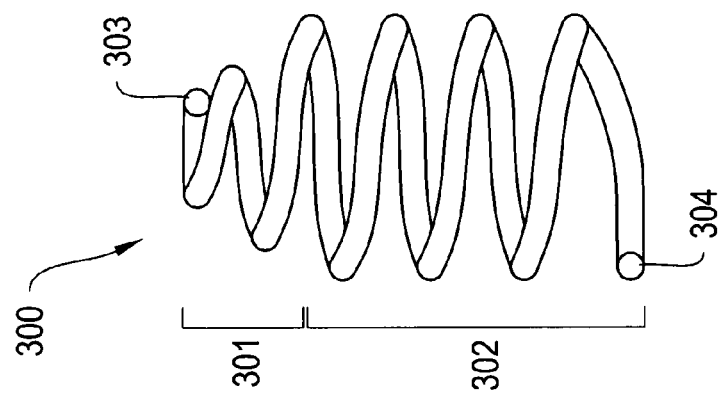

The spring rate of the spring coils may be modified by changing the proportion of the height of the top portion and/or the bottom portion as compared to the overall height of the spring coil. FIG. 3A shows a spring coil 300 having a frustoconical top portion 301 that is about ¼ the total height of the spring coil and a cylindrical bottom portion 302 that is about ¾ the total height of the spring coil. The spring 300 also has a top end 303 and a bottom end 304. FIG. 3B shows a spring coil 310 having a frustoconical top portion 311 that is about ½ the total height of the spring coil and a cylindrical bottom portion 312 that is about ½ the total height of the spring coil. The spring 310 also has a top end 313 and a bottom end 314. FIG. 3C shows a spring coil 320 having a frustoconical top portion 321 that is about ¾ the total height of the spring coil and a cylindrical bottom portion 322 that is about ¼ the total height of the spring coil. The spring 320 also has a top end 323 and a bottom end 324. The top portion and/or the bottom portion may be selected as having a length that is any suitable proportion of the total height of the spring coil without departing from the scope of the invention. Altering the relative size of the top portion and/or the bottom portion may help fine-tune the spring to support users having different weights. The spring coil may include any number of portions having suitable spring rates and/or pitches and/or shapes and/or heights without departing from the scope of the invention.

FIGS. 4A and 4B depict various views of an exemplary encased asymmetrical spring 500. FIG. 4A shows a spring coil 500 having a frustoconical top portion 501 and a cylindrical bottom portion 502. The spring coil may have a top end 503 and a bottom end 504. In addition, the spring coil may have an encasing 506, such as fabric. The encasing material may be, for example, fabric or foam. In certain embodiments, the encasing 506 includes fire-retardant material. Encasing 506 may be useful to attach together a row of adjacent spring coils. Encased coils may improve the manufacturing process by obviating the need to connect adjacent open coils with hog rings or other metal fasteners. FIG. 4B shows an angled view of an encased spring coil 520. The spring coil 521 is covered with an encasing 522.

Figure 5:
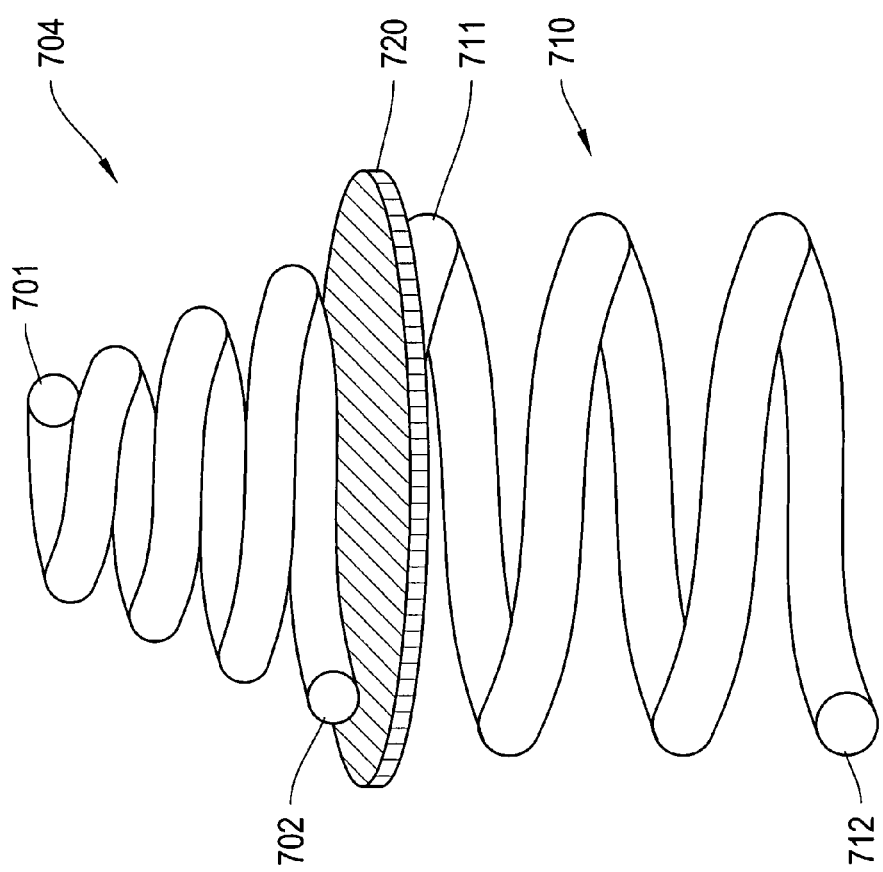
FIG. 5 depicts an exemplary asymmetric spring assembly having two stacked springs.

FIG. 5 depicts an exemplary spring assembly having two stacked springs. The upper spring 704 has a frustoconical shape, and the lower spring 710 is cylindrical. The upper spring 704 has a top end 701 and a bottom end 702. The lower spring 710 has a top end 711 and a bottom end 712. The spring assembly includes a supporting layer 720 between the upper 704 and lower springs 710. The supporting layer 720 may form a stable base for the upper spring. The two stacked springs have a substantially similar spring rate to one asymmetrical spring with an upper frustoconical portion and a lower cylindrical portion depicted in FIGS. 1A-3C.

In certain embodiments, the two stacked springs 704 and 710 may be formed from a substantially similar gauge of wire. Alternatively, they may be formed from different gauges of wire. The gauge of wire for the upper and/or lower stacked springs may be selected depending on a desired spring rate.

The supporting layer 720 may be made of metal or any other strong material. It may be coated with a substance such as plastic. One may use different techniques to prevent the upper and lower springs from sliding along the supporting layer. For example, the supporting layer may be formed with grooves that the springs lie in. Also, one may coat the supporting layer with a substance that increases its coefficient of friction. As such the assembly of stacked springs may be made stable, by any suitable method and apparatuses without departing from the scope of the invention.

Figure 6:
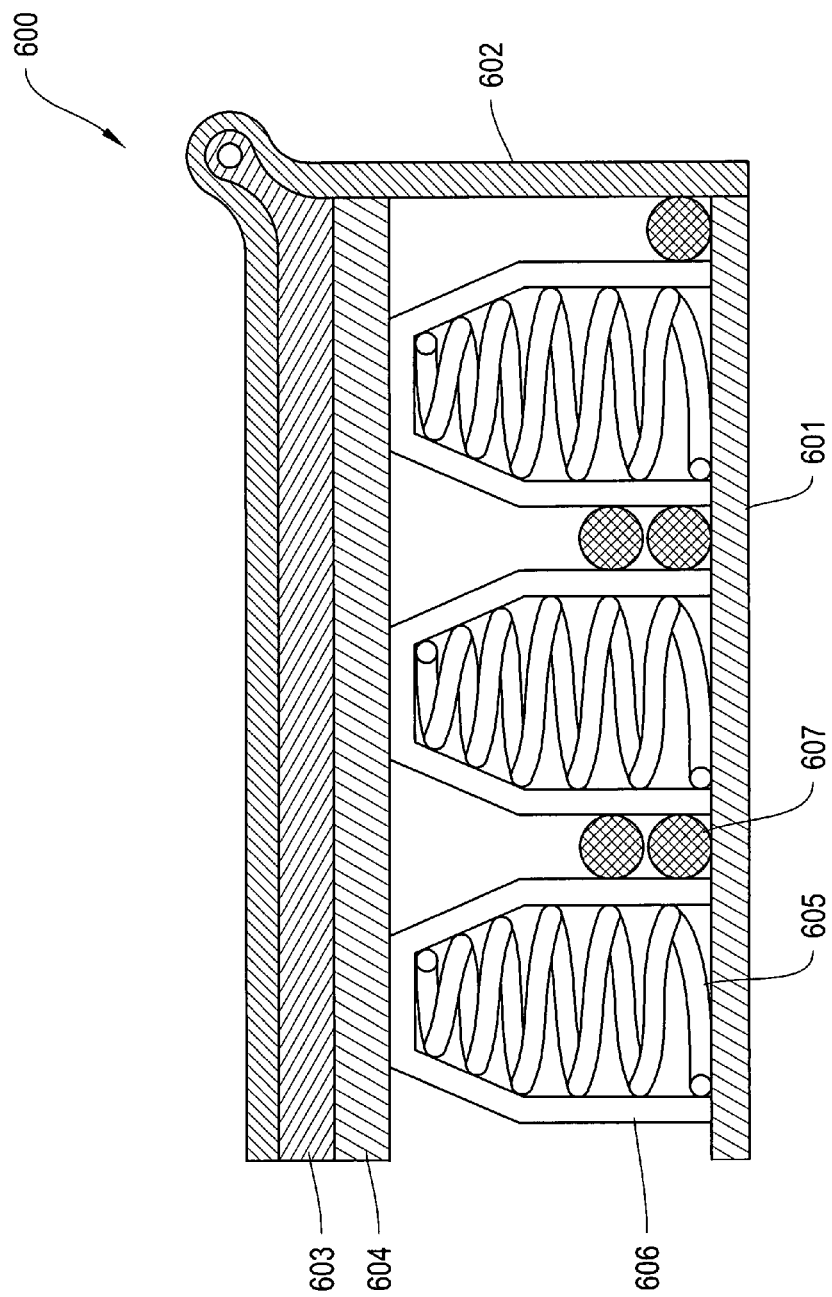
FIG. 6 depicts a cross-section view of a mattress containing an innerspring assembly with asymmetric springs, according to an illustrative embodiment of the invention.

In certain embodiments, an innerspring assembly of a mattress includes a plurality of such stacked springs that are held together with a hog ring or other metal fasteners. The stacked springs in innerspring assemblies may be open or encased. FIG. 6 depicts a cross section view of a mattress 600 containing a plurality of asymmetric springs 605. The mattress 600 may have a bottom layer 601 and a layer of upholstery 602. The mattress may also have one or more foam layers 603 and additional layers 604. The mattress comprises at least one asymmetric spring 605 which may be encased in a pocket 606. Adjacent springs may be connected with attachments 607 such as glue.

The bottom layer 601 provides support to the mattress and prevents sagging. This layer may include rigid materials such as wood, metal, resins, or sturdy plastic. The upholstery layer 602 forms a soft but durable outer surface to the mattress. The upholstery layer may protect the inner components of the mattress against daily wear and tear. It also provides a soft sleeping surface for the mattress user. In certain embodiments, the mattress 600 may have additional layers 604. Additional layers 604 may include fire-retardant materials to improve the safety of the mattress, water-resistant materials, water-proof materials, allergen-reducing material, mite-proof materials, or materials that protect against other organisms. Alternatively, an additional layer could be a soft material such as foam 603 that improves the comfort of the mattress.

The mattress 600 includes an innerspring assembly having at least one asymmetric spring 605. The spring 605 may be similar to the springs described with reference to FIGS. 1-5. The innerspring assembly could contain two or more different kinds of springs. For example, the stiffer springs may be used in the part of the mattress where a user requires greater support. Alternatively, one half of the mattress could have stiffer springs for a heavier sleeping partner and the other half could have softer springs for a lighter sleeping partner. A further option would be to place stiffer springs in the center of the mattress than at the edges, since the center of the mattress is the first part to sag over time.

One or more asymmetric springs 605 in the mattress 600 may be encased in a pocket 606. This pocket may be made of fabric, foam, or other material. One continuous piece of encasing material may cover multiple coils, connecting them. Adjacent encased coils may alternatively be connected by gluing the encasing material together. Open coils, in contrast, may be connected with a hog ring or other metal fasteners.

The mattress 600 may be manufactured using techniques known in the art of mattress making, in combination with techniques for manufacturing asymmetrical springs disclosed herein.

In one set of experimental data, the results of which are set forth in Table 1, asymmetric spring coils (similar those shown in FIGS. 1-5) were tested by applying different loads.

TABLE 1

| Specimen # | Height in | Elongation at Peak in | Strain At Peak % | Peak Load lbf | Spring Rate lbf/in |
|---|---|---|---|---|---|
| 1 -- Coil 5B | 10.125 | 7.000 | 0.631 | 2.475 | 0.354 |
| 2 -- Coil 6 | 8.625 | 7.000 | 1.142 | 4.477 | 0.640 |
| 3 -- Coil 5A | 8.750 | 7.000 | 0.698 | 2.736 | 0.391 |
| Mean | 9.167 | 7.000 | 0.824 | 3.229 | 0.461 |
| Std. Dev. | 0.832 | 0.000 | 0.278 | 1.088 | 0.155 |

Figure 7:
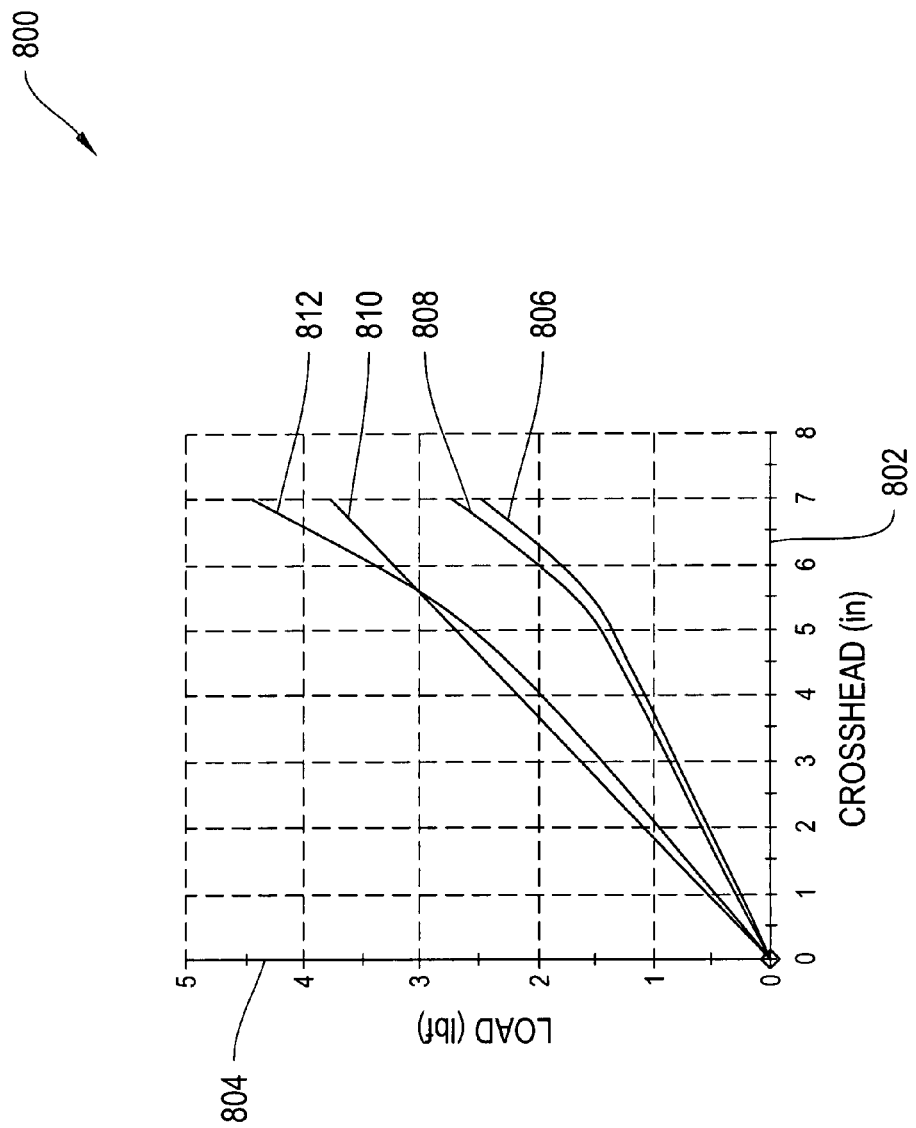
FIG. 7 depicts a graph 800 illustrating the compression of exemplary asymmetrical springs in response to different loads.

Table 1 displays, for each of three spring coils, the height, elongation at peak, strain at peak, peak load, and spring rate. The behavior of each spring is shown in more detail in the graph 800 in FIG. 7. FIG. 7 depicts a graph 800 illustrating the compression of exemplary asymmetrical springs in response to different loads. The horizontal axis 802 shows compression, measured in inches. The vertical axis 804 shows the amount of load applied to the spring. Plots 806, 808 and 812 depict the compression of different asymmetrical springs under different loads. Plots 806, 808 and 812 are substantially straight lines at low loads, indicating linear compression. At higher loads, Plots 806, 808 and 812 are curved, indicating non-linear compression. Plot 810 is a straight line illustrating the theoretical behavior of a spring with only a linear spring rate. This graph demonstrates that at higher loads (e.g., greater than 3 lbf), the asymmetrical springs (e.g., spring having response shown in plot 812) resist compression and therefore compress less than a spring with a linear spring rate (e.g., spring having response shown in plot 810).

Variations, modifications, and other implementations of what is described may be employed without departing from the spirit and scope of the invention. More specifically, any of the method, system and device features described above or incorporated by reference may be combined with any other suitable method, system or device features disclosed herein or incorporated by reference, and is within the scope of the contemplated inventions. The systems and methods may be embodied in other specific forms without departing from the spirit or essential characteristics thereof. The foregoing embodiments are therefore to be considered in all respects illustrative, rather than limiting of the invention. The teachings of all references cited herein are hereby incorporated by reference in their entirety.

What is claimed as new and desired to be protected by Letters Patent of the United States is:

1. An innerspring assembly including a plurality of spring coils, comprising
    at least one asymmetrical spring assembly, each asymmetrical spring assembly having within itself and separate from another asymmetrical spring assembly;
    an upper spring portion with a first substantially linear spring rate and a first substantially nonlinear spring rate, and
    a lower spring portion disposed below the upper spring portion with a second substantially linear spring rate,
    a supporting layer between the upper spring portion and the lower spring portion, wherein the supporting layer separates the upper spring portion from the lower spring portion such that there is no direct contact between the upper and lower spring portions and is configured to independently support only the upper spring portion disposed directly thereon,
    wherein the second substantially linear spring rate is greater than the first substantially linear spring rate, and wherein the spring coil is configured such that in first compressed state, the upper portion is substantially compressed and lower portion is substantially uncompressed.

2. The innerspring assembly of claim 1, wherein the upper spring portion includes a plurality of coils having a similar first pitch, and the lower spring portion includes a plurality of coils having a similar second pitch, such that the first pitch is different from the second pitch.

3. The innerspring assembly of claim 1, wherein the spring coil assembly, in response to a load, undergoes linear compression before undergoing nonlinear compression.

4. The innerspring assembly of claim 1, wherein the upper spring portion of the spring coil assembly is selected from the group of substantially conical and substantially frustoconical.

5. The innerspring assembly of claim 1, wherein the lower spring portion of the spring coil assembly is substantially cylindrical.

6. The innerspring assembly of claim 1, wherein the upper spring portion of the spring coil assembly comprises between one fourths and three fourths of the spring coil height.

7. The innerspring assembly of claim 1, wherein the upper and lower portions of the spring coil assembly are formed from metallurgical composition containing one or more selected from the group of steel, chromium, nickel, molybdenum, copper, titanium, cobalt, niobium, vanadium, aluminum, platinum, and tungsten.

8. The innerspring assembly of claim 1, wherein the upper and lower portions of the spring coil assembly are formed from multi-stranded wire cable.

9. The innerspring assembly of claim 1, wherein the spring coil assembly comprises an encased coil.

10. The innerspring assembly of claim 1, wherein the spring coil assembly comprises an open coil.

11. The innerspring assembly of claim 1, wherein the spring coil assembly includes an offset coil at each end.

12. The innerspring assembly of claim 1, wherein the spring coils are arranged in rows and columns such that each spring coil is adjacent to at least one other spring coil.

13. The innerspring assembly of claim 12, wherein adjacent spring coils are connected with adhesive.

14. The innerspring assembly of claim 12, wherein adjacent spring coils are connected with at least one of a hog ring and other metal fasteners.

15. The innerspring assembly of claim 12, wherein adjacent spring coils are not connected along the upper portion of the coils.

16. The innerspring assembly of claim 1, wherein the innerspring assembly is adapted for a cushioned support structure such as a mattress.

17. A cushioned support structure comprising an innerspring assembly including a plurality of spring coils, comprising
    at least one asymmetrical spring coil assembly, each asymmetrical spring having within itself and separate from another asymmetrical spring assembly
    an upper spring coil with a first substantially linear spring rate and a first substantially nonlinear spring rate, and
    a lower spring coil disposed below the upper spring coil with a second substantially linear spring rate,
    a supporting layer between the upper spring coil and the lower spring coil, wherein the supporting layer separates the upper spring coil from the lower spring coil such that there is no direct contact between the upper and lower spring coils and is configured to independently support only the upper spring coil disposed directly thereon, wherein the second substantially linear spring rate is greater than the first substantially linear spring rate, and wherein the spring coil is configured such that the upper spring coil compresses substantially before the lower spring coil begins to compress.

18. The cushioned support structure of claim 17 that is a standard mattress size such as twin, twin XL, frill, frill XL, queen, Olympic queen, king, or California king.

19. The cushioned support structure of claim 17 further comprising, at least one additional layer disposed adjacent to the innerspring assembly, wherein the at least one additional layer includes at least one of a padding layer, an upholstery layer, a frame layer, a quilted layer, a foam layer, a batting layer, and a waterproof layer.

20. A single asymmetrical compression spring coil assembly, comprising
   an upper conical portion with a first linear spring rate and a first nonlinear spring rate,
   a lower cylindrical portion disposed below the upper spring portion with a second linear spring rate, and
   a supporting layer between the upper conical portion and the lower cylindrical portion wherein the unitary rigid supporting layer separates the upper conical portion from the lower conical portion such that there is no direct contact between the upper and lower conical portions and is configured to independently support only the upper conical portion disposed directly thereon,
   wherein the second linear spring rate is greater than the first linear spring rate, and
   wherein the spring coil assembly is configured such that the upper portion compresses substantially before the lower portion begins to compress.

21. A single asymmetrical compression spring coil assembly for use in a mattress, comprising
   an upper substantially frustoconical spring coil with a first linear spring rate and a first nonlinear spring rate,
   a lower substantially cylindrical spring coil disposed below the upper substantially frustoconical spring coil with a second linear spring rate, and
   a supporting layer between the substantially frustoconical spring coil and the lower substantially cylindrical spring coil wherein the unitary rigid supporting layer separates the upper spring portion from the lower spring portion such that there is no direct contact between the upper and lower spring portions and is configured to independently support only the upper spring portion disposed directly thereon,
   wherein the second linear spring rate is greater than the first linear spring rate, and
   wherein the spring coil is configured such that in first compressed state, the upper portion is substantially compressed and lower portion is substantially uncompressed.

22. An innerspring assembly, comprising at least one coil of claim 21.

* * * * *